United States Patent [19]

Rolsten

[11] 4,260,341

[45] Apr. 7, 1981

[54] HAND PUMP

[75] Inventor: Robert F. Rolsten, Dayton, Ohio

[73] Assignee: The Wright Company, Dayton, Ohio

[21] Appl. No.: 122

[22] Filed: Jan. 2, 1979

[51] Int. Cl.³ ........................ F04B 21/06; F16L 17/06

[52] U.S. Cl. .................................... 417/454; 417/554; 285/377; 285/362

[58] Field of Search ........................ 417/434, 454, 554; 403/316, 349; 285/377, 362

[56] References Cited

U.S. PATENT DOCUMENTS

| | | | |
|---|---|---|---|
| 193,810 | 8/1877 | Eccloston | 285/377 |
| 771,094 | 9/1904 | Rhoads | 285/362 |
| 1,033,187 | 7/1912 | Metzger | 403/349 |
| 1,213,492 | 4/1917 | Hughes | 403/316 |
| 1,241,962 | 10/1917 | Greve | 403/316 |
| 1,299,934 | 4/1919 | Harnett | 403/349 |
| 3,040,712 | 6/1962 | Harrah | 220/298 |
| 3,131,646 | 5/1964 | Parrott | 417/454 |
| 3,537,730 | 11/1970 | Kresin | 285/362 |
| 3,583,837 | 6/1971 | Rolsten | 417/554 |
| 3,701,548 | 10/1972 | McGuire | 285/360 |

FOREIGN PATENT DOCUMENTS

| | | | |
|---|---|---|---|
| 1438195 | 6/1976 | United Kingdom | 403/315 |

*Primary Examiner*—William L. Freeh

*Attorney, Agent, or Firm*—Biebel, French & Nauman

[57] ABSTRACT

A double acting pump includes an elongated thin walled hollow barrel, having an inlet end and a head end, and an elongated hollow plunger slidably received in said barrel and forming with its inner surface an annular space. A two piece detachable fitting includes one part on the head end of the barrel, and a mating part with a seal between one end of the barrel and the outer surface of the plunger. A valve assembly and seal is mounted on the inlet end of the plunger, with that seal engaging the interior of said plunger. A nozzle is mounted on the discharge end of the plunger. A two piece inlet fitting includes one part on the inlet end of the barrel, a mating detachable part having an inlet valve seat, and a check valve captured between the parts of the inlet fitting and cooperating with the seat to allow flow into the barrel. A filter piece is supported in the detachable part of the inlet fitting and also functions to capture the check valve between the seat and the filter piece.

4 Claims, 8 Drawing Figures

HAND PUMP

BACKGROUND OF THE INVENTION

A double acting pump, that is, one which ejects fluid on both strokes of the pumping mechanism, is disclosed in Rolsten U.S. Pat. No. 3,583,837 issued June 8, 1971, and in the prior art cited therein. In a pump of this type it is desirable to minimize the numer of moving parts required, the number of packing glands and seals, and to lighten and simplify the construction is all ways possible without impairing the usefulness and durability of the pump.

SUMMARY OF THE INVENTION

A pump constructed in accordance with the present invention provides portable manually operable, double acting pump operable with low physical exertion, light in weight for ease of carrying, and simplified in construction so as to be mass producible without impairing these features. If replacement of components of the pump becomes necessary, the pump may be readily disassembled by hand or with rudimentary tools, and the particular malfunctioning component replaced. This can be done under all sorts of conditions.

Also provided are additional parts, an inlet foot member and/or a portable liquid reservoir, which adapt the pump to useful hand pumping systems in remote areas. Such systems may be used in "spot" firefighting, forestry applications, orchards, etc.

Therefore, the primary object of this invention is to provide such a novel pump with improved components that are easy to assemble and take apart, and that lend themselves to inexpensive high volume production; and to provide with such a pump novel hand operated liquid pumping systems.

Other objects and advantages of the present invention will be apparent from the following description and the appended claims.

DESCRIPTION OF THE PREFERRED EMBODIMENTS

Figures 3, 4, 5, 6, 7, 8:
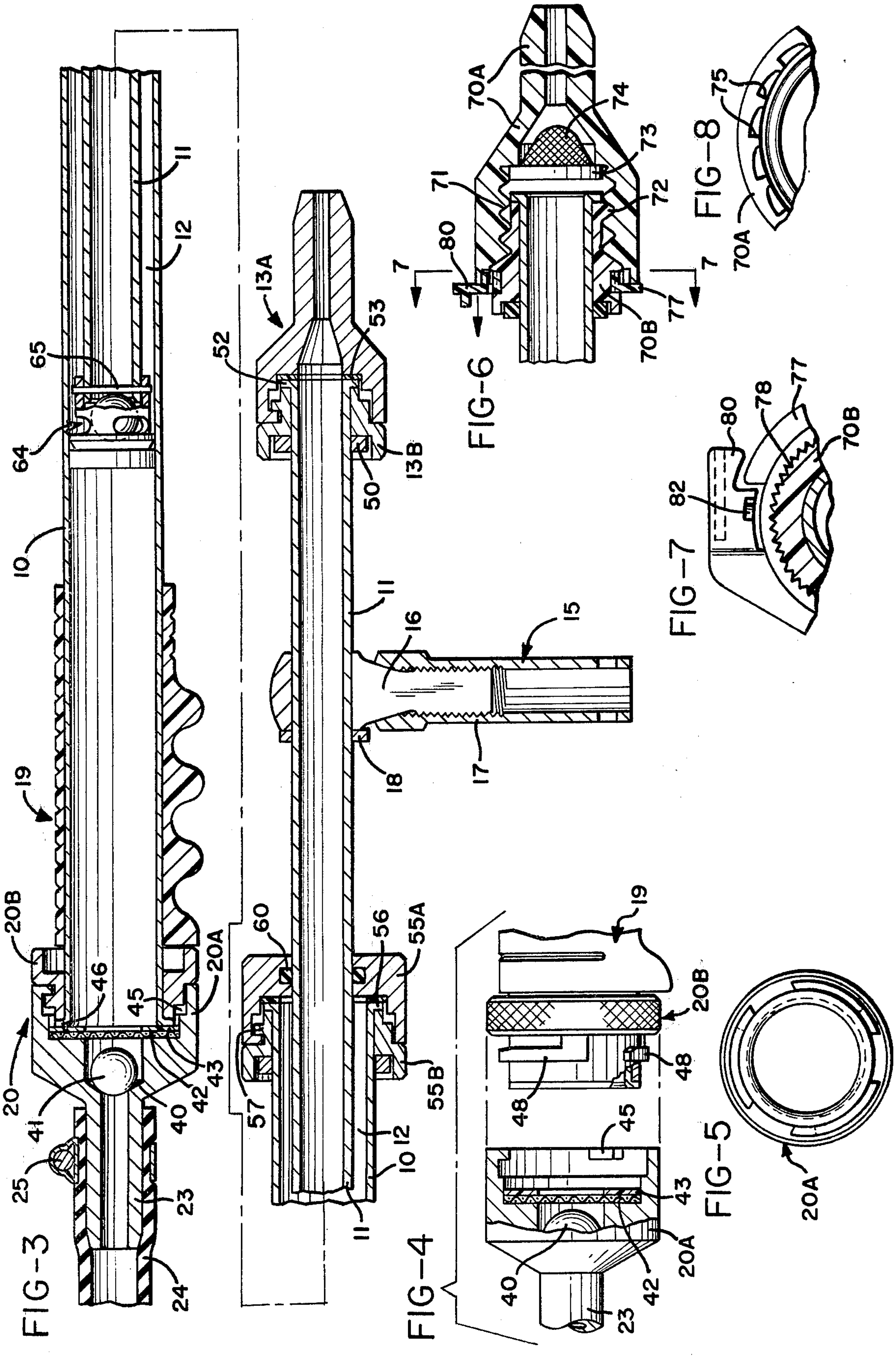
FIG. 3 is a cross sectional view of the pump showing one preferred form of inlet and nozzle fittings forming part of the present invention.
FIG. 4 is an enlarged view of the inlet portion of the pump of FIG. 3.
FIG. 5 is an end view of the inlet fitting.
FIG. 6 is a view showing a second preferred embodiment of inlet and nozzle fittings.
FIG. 7 is an enlarged view taken on line 7—7 of FIG. 6.
FIG. 8 is a detail view of part of the nozzle fitting.

As seen in FIG. 3 of the drawings, a pump according to the present invention includes a thin walled elongated hollow barrel 10 having a thin walled elongated hollow plunger 11 slidably received therein. The outer surface of plunger 11 defines with the inner surface of the barrel 10 an annular space 12. The wall thickness of the barrel and plunger, if made of a light metal such as aluminum, may be in the order of 0.010 inches, too thin to be threaded and maintain structural integrity. This thin material also lightens the overall assembly. Glass fiber reinforced plastic material, also is difficult to form with fine threads, may have a thickness in the order of 0.075 to 0.085 inches. The outer end of plunger 11 terminates in a nozzle 13 attached to the plunger as hereafter described. Intermediate its ends plunger 11 is also provided with a handle 15 which may include an upper split section 16 encircling the plunger 11 and threaded into a lower socket portion 17. A resilient bumper washer 18 encircles plunger 11 adjacent the handle 15.

Figures 1, 2:
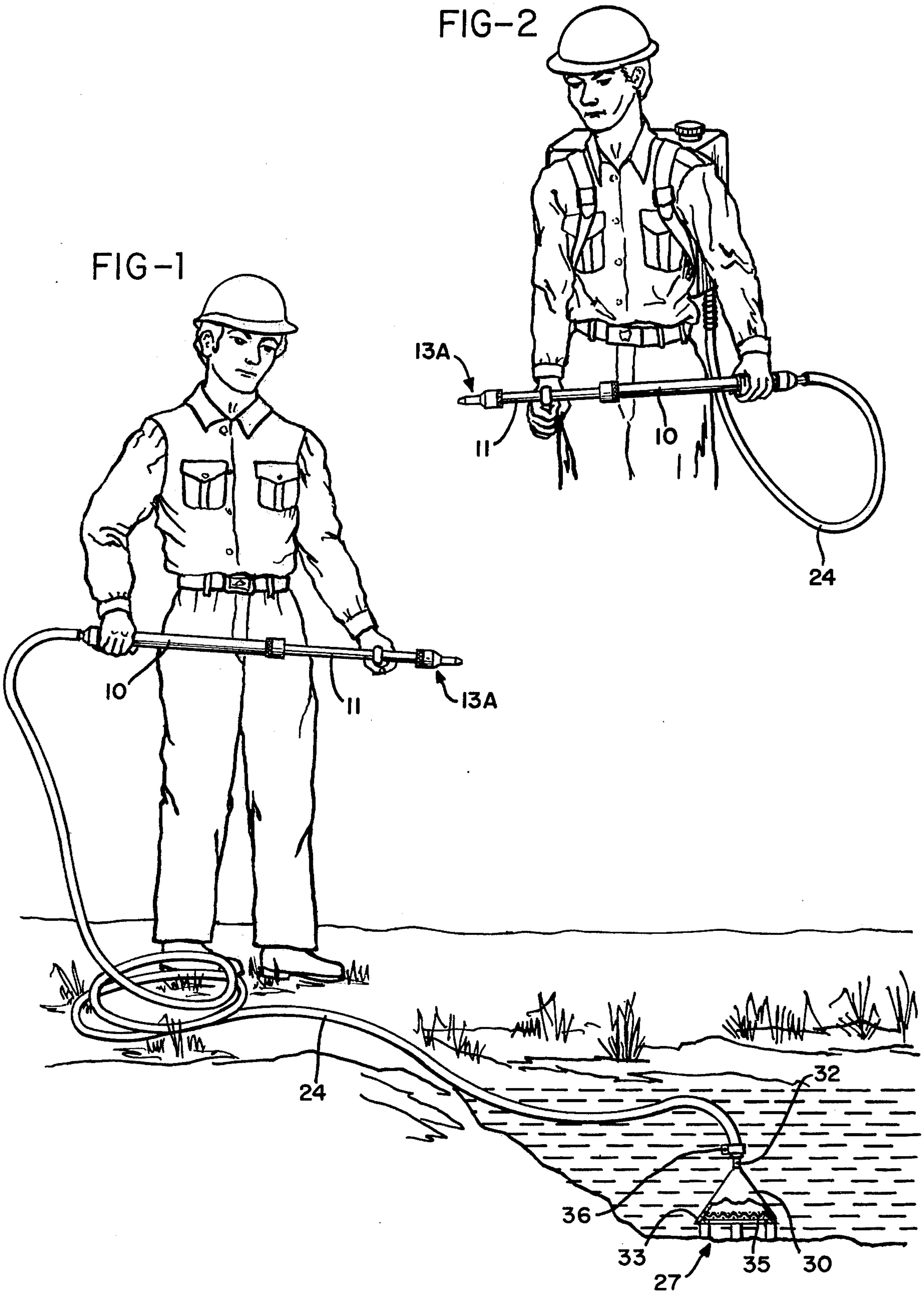
FIG. 1 is a view of the pump being used with a special remote inlet foot and filter.
FIG. 2 shows the pump used with a special back pack liquid supply.

The barrel 10 is provided with a hand grip 19 and an inlet and valve housing 20. Housing 20 is attached to the inlet end of the barrel, and the nozzle is attached to the plunger, in the same manner. Also, a hose 24 is clamped to the housing nipple 23 by means of a conventional clamp 25. The hose 24 leads to a source of the fluid which it is desired to pump. In the form shown in FIG. 1, a remote inlet foot 27 is provided. This foot is in the form of a housing 30 which may be shaped generally like an inverted funnel, including an upper hollow stem part 32 and a downwardly and outwardly flared bottom 33 containing a filter or screen 35. The housing 30 is either made of a heavy material, such as brass, or it has some provision for being weighted, such that it supports itself, as shown with the filter submerged. The other end of hose 24 is attached to stem part 32 by a clamp 36, and the hose is of sufficient length to allow the pump operator an adequate range or movement for the inlet foot.

The inlet housing 20 is divided into two interlocking parts 20A and 20B, each of which may be molded from suitable plastic material, or easily cast of inexpensive lightweight metals. Part 20A includes the nipple 23, and provides a seat 40 for an inlet valve member in the form of a ball 41. This ball is captured in part 20A by a screen 42 and a pliable seal ring 43, both of which are fitted into the enlarged open end of part 20A.

The part 20A is formed internally at its larger end, opposite nipple 23, with a bayonet slot arrangement 45. Part 20B is fitted over the end of barrel 10, captured between an end of grip 19 and the outwardly turned or formed end 46 of the barrel. Thus, the barrel can be made of thin lightweight metal or equivalent stock, and does not have to be thick enough to be threaded or otherwise cut or machined. The exterior of part 20B is formed with bayonet lugs 48 which engage the slot arrangement in part 20A. The lugs and/or the slots are suitably tapered to draw the parts 20A and 20B together when rotated appropriately. This action forces the end 46 of the barrel against seal ring 43 to make a liquid tight seal. The parts 20A and 20B have sufficient surface area that they may be gripped manually and relatively rotated for assembly and disassembly, and their exterior cylindrical surfaces may be roughened for better gripping. If it is desired to omit the flanged end 46, the part 20B can be secured around the end of the barrel with a suitable adhesive.

Nozzle 13 is similarly formed of two parts 13A and 13B. Part 13A is formed with an internal bayonet slot arrangement (as inlet part 20A), and part 13B is provided with corresponding interlocking bayonet lugs. The part 13B can be held at the end of plunger tube 11 by a split ring 50 which traps part 13B against the outwardly turned end 52 of the plunger tube. A seal ring 53 is fitted within part 13A,to be compressed against plunger end 52 when the nozzle parts are joined. Again, such a construction enables the use of thin walled material for the tubular plunger similarly to the barrel, and contributes to the overall inexpensive lightweight, yet desirable and efficient construction.

The sliding, external seal between the front end of barrel 10 and the outside surface of plunger tube 11 is also provided in a similar way. A fitting comprising parts 55A and 55B is fitted with the part 55B abutting the flared forward edge 56 of the barrel, and having bayonet lugs 57 on its outer forward end. Part 55A is provided with the bayonet slots, and also with a replaceable seal ring 60 which forms a continuous sliding seal against the outer surface of the plunger.

The inner end of plunger tube 11 carries a combined valve assembly and seal 64, which may be of a type such as shown in U.S. Pat. No. 3,583,837. The assembly is attached to the inner end of the plunger tube by a removable pin 65 which can be released to detach the entire assembly for repair or replacement.

The entire pump can thus be disassembled and repaired without need for any tools. The parts likely to require repair or replacement, such as parts 13A, 20A, 55A and 64 are readily removed, seals can be replaced as necessary, and the valves cleaned or replaced, and parts likely to be damaged such as nozzle part 13A, can also be easily replaced. No special tools are needed, in fact the job can normally be done by hand.

FIGS. 6, 7 and 8 show an alternate form of quick-detach fitting which can be substituted for any or all of the bayonet-back fittings previously described. The alternate form features a coarse thread attachment which it is possible to mold as part of a plastic molded part. Also included is a latch to prevent this coarse thread from loosening accidentally.

FIG. 6 shows the alternate fitting applied to the nozzle end. The nozzle part 70A has an internal coarse thread 71 which engages a male thread 72 formed on the part 70B, the part 70B in turn mounted on the end of tube 11. A washer 73 carrying a screen 74 may be contained in part 70A if desired.

The internal rear edge of part 70A is formed with a series of locking teeth 75, preferably cam shaped as shown in FIG. 6. A lock ring 77 of flexible plastic is fitted over part 70B, and fixed against rotation by the interengaging teeth 78. The lock ring has a flixible tab 80, with a lock tooth 82 that can engage in any one of the teeth 75. Normal position of the tab promotes such engagement, and the tab can be flexed rearward to withdraw tooth 82.

When the parts 70A, 70B are threaded together, tooth 82 will ratchet along the locking teeth 75 until the parts are firmly engaged, then will prevent reverse rotation. To unthread the parts, tab 80 is flexed to withdraw tooth 82, then the parts can be unthreaded.

While the form of apparatus herein described constitutes a preferred embodiment of this invention, it is to be understood that the invention is not limited to this precise form of apparatus, and that changes may be made therein without departing from the scope of the invention.

What is claimed is:

1. In a double acting pump including an elongated thin walled hollow barrel having an inlet end and a head end, said ends of said barrel having outwardly turned edges, an elongated hollow plunger having a discharge end and an inlet end slidably received in said barrel and defining with the inner surface thereof an annular space, a two piece detachable fitting including one part on the head end of said barrel and a mating part including a seal between said one end of said barrel and the outer surface of said plunger, said parts of said fitting being engaged around the outwardly turned edge of said head end, a valve assembly and seal mounted on the inlet end of said plunger, said seal engaging the interior of said plunger, a nozzle on said discharge end of said plunger, a two piece inlet fitting including one part on the inlet end of said barrel and a mating detachable part having an inlet valve seat, said parts of said inlet fitting being engaged around the outwardly turned edge of said inlet end, and a check valve captured between said parts of said inlet fitting and cooperating with said seat to allow flow into said barrel.

2. A pump as defined in claim 1 wherein a filter piece is supported in said detachable part of said inlet fitting and also functions to capture said check valve between said seat and said filter piece.

3. A pump as defined in claim 1 wherein said two piece fittings are provided with cooperating bayonet lug and slot configurations enabling said fittings to be parted without tools and to be joined in sealed relation.

4. A pump as defined in claim 1 wherein said two piece fittings are provided with cooperating coarse threaded parts capable of engagement and disengagement without tools, and retainers arranged to hold said parts in fully engaged relation.

* * * * *